S. S. HAYWARD.
Milk Cooler.
No. 232,026.
2 Sheets—Sheet 2.
Patented Sept. 7, 1880.
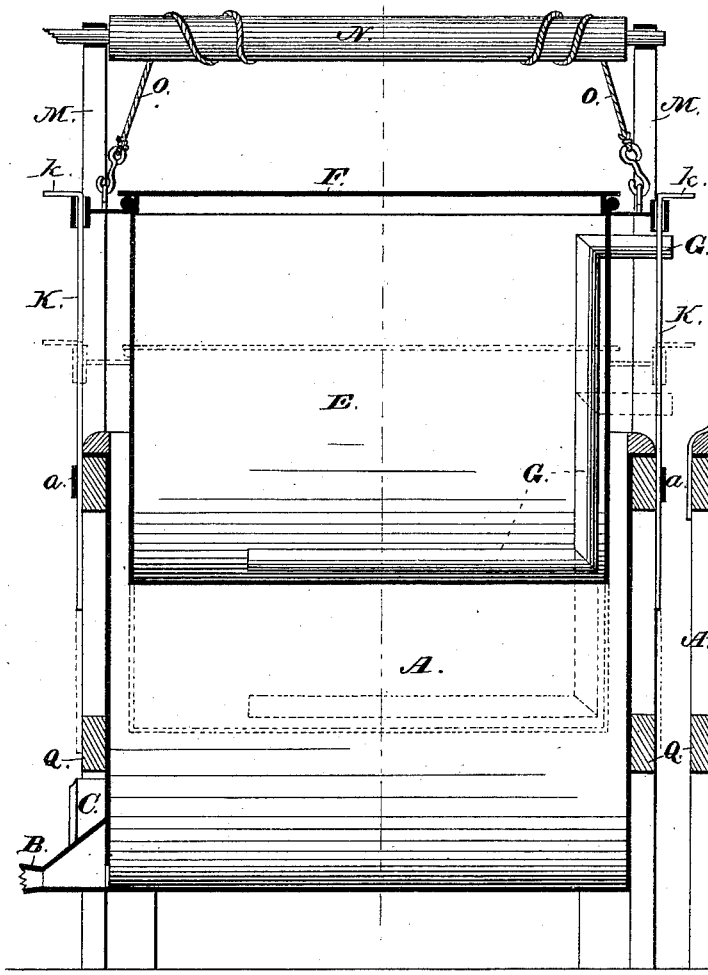
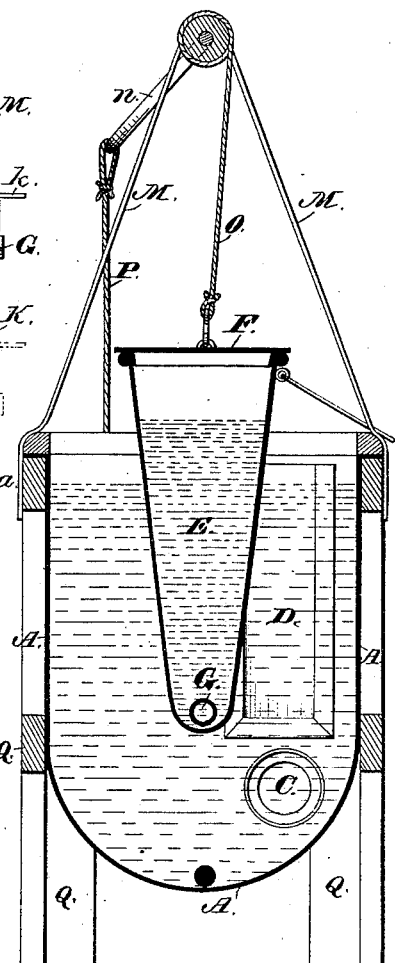

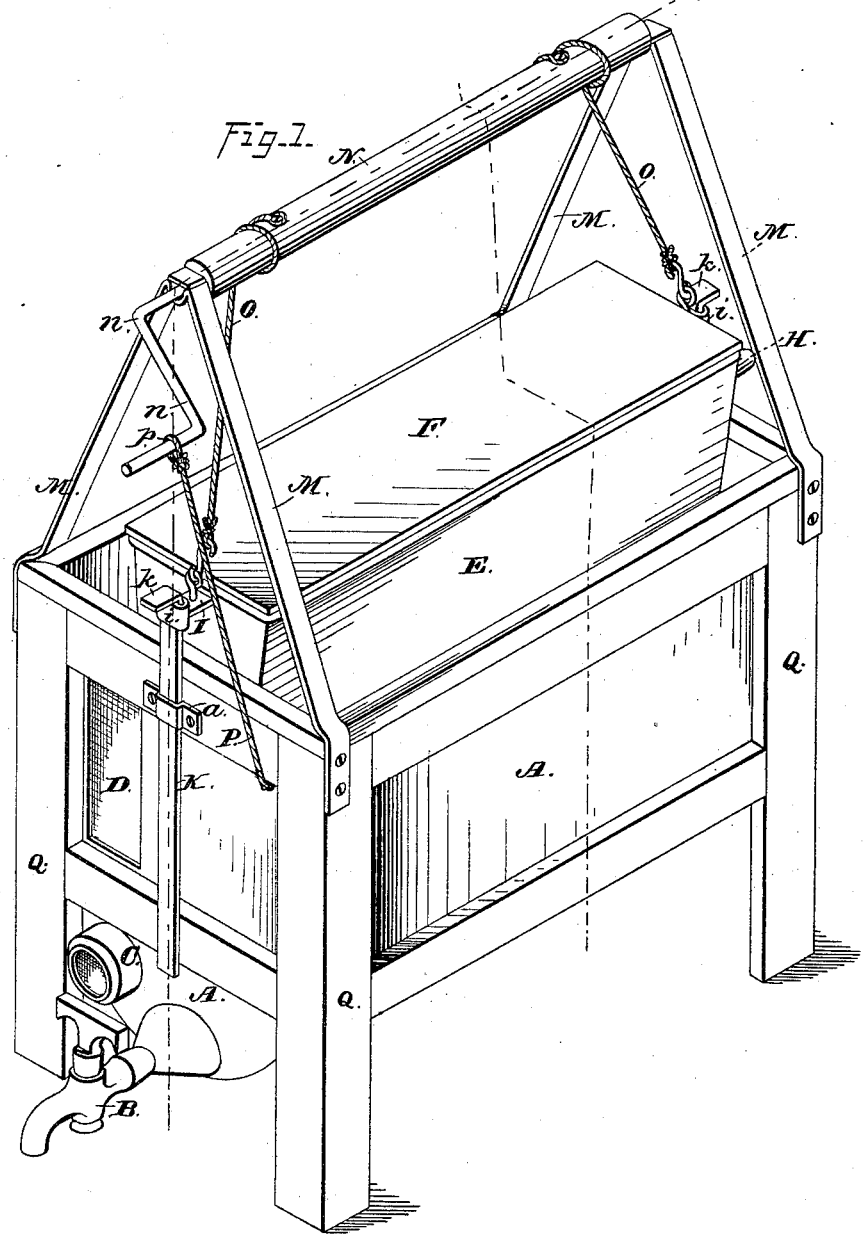

UNITED STATES PATENT OFFICE.

SAMUEL S. HAYWARD, OF NORWICH, NEW YORK.

MILK-COOLER.

SPECIFICATION forming part of Letters Patent No. 232,026, dated September 7, 1880.

Application filed January 17, 1880.

*To all whom it may concern:*

Be it known that I, SAMUEL S. HAYWARD, of Norwich, in the county of Chenango, and in the State of New York, have invented certain new and useful Improvements in Milk-Coolers; and I do hereby declare that the following is a full, clear, and exact description thereof, reference being had to the accompanying drawings, making a part of this specification, in which—

Figure 1 is a perspective view of said device when in use. Fig. 2 is a vertical longitudinal section of the same upon a central line, the full lines showing the ice-reservoir elevated; and Fig. 3 is a vertical cross-section.

Letters of like name and kind refer to like parts in each of the figures.

The design of this invention is to facilitate the production of cream and render more easy its removal from milk; to which end it consists, principally, in a milk-cooler in which the elements are constructed, combined, and operate in the manner and for the purpose substantially as hereinafter specified.

It consists, further, in the means employed for adjusting the reservoir to and securing it in vertical position, substantially as and for the purpose hereinafter shown.

In the annexed drawings, A represents a milk reservoir or vat having a rectangular form in plan view, and having, preferably, a depth equal to about twice its transverse dimensions. The ends of said reservoir are vertical, while its sides, near its lower end, are curved downward and inward, so as to give to the bottom a semicircular form. The reservoir A is provided at one end, immediately above its bottom, with a spigot, B, through which milk contained within may be discharged, and near said spigot is provided a glazed opening, C, through which the lowest portion of the interior of said casing may be seen. A second vertically-elongated opening, D, extends from near the upper edge of said reservoir downward below its vertical center, and is inclosed with glass for the purpose of affording a view of the liquid contents of the same.

Within the upper side of the reservoir A is placed an ice-reservoir, E, which has the same general shape in plan view as the former, but has considerably less dimensions horizontally, and in depth has but little more than three-fourths the depth of said milk-reservoir.

The end walls of the ice-reservoir E are vertical, while its side walls from above incline inward and downward until the transverse dimensions near the rounded bottom are reduced about one-half. The upper side of the reservoir E is inclosed by means of a cover, F, and for the purpose of passing cool water into its interior and permitting the escape therefrom of water that has absorbed heat from the milk, an inlet-pipe, G, passes horizontally inward through one of the ends, near its top, thence downward to a point near the bottom, and thence horizontally to a point near the opposite end, while an outlet-pipe, H, passes horizontally outward through the latter near the top.

From each end, at the top of the reservoir E, a lug, I, extends horizontally outward beyond the end of the reservoir A, where it is provided with a vertical opening, *i*, that receives a bar, K, which latter has at its upper end a head, *k*, and its lower portion passes through a strap, *a*, that is secured upon the end of said reservoir A, or upon its supporting-frame, the arrangement of parts being such as to cause said bars to operate as guides while said inner reservoir, E, is being moved vertically.

Journaled within suitable supports M, that are arranged above the reservoirs A and E, is a shaft, N, that at one end is provided with a crank, *n*, and at a point near each end has secured one end of a cord or chain, O, the opposite end of which is attached to the lug I of the corresponding end of said reservoir E. By rotating the shaft N the cords O will be wound upon or unwound from the same, and the reservoir E correspondingly raised or lowered. A cord, P, attached at one end to the frame of the outer reservoir, A, and provided at its opposite end with a loop, *p*, which may be passed over the crank *n*, enables the latter to be locked in position when said reservoir E has been adjusted to height.

The device, being placed within a suitable supporting-frame, Q, is used as follows, viz: Milk is placed within the reservoir A and ice or cold water within the reservoir E, after which the latter is adjusted vertically until its bottom is slightly below the point to which cream is expected to reach. The central portion of the milk at the surface will be cooled by contact with the sides and bottom of the ice-reservoir, and will descend vertically to the bottom of the milk-reservoir, while an upward current of warmer milk will be produced at each side of the latter, such movement being continued as long as there is any material difference in temperature between said milk and the exterior of said ice-reservoir.

The movement of the milk described will cause the cream to rise to and remain upon the top, but in consequence of the extension of the ice-vat below said cream the milk will be in direct contact with the cooling medium, and its temperature will be constantly lowered, while if said cooling medium was applied to the surface only a slight film of cream collecting upon the top would retard the abstraction of heat, cream being a poor conductor of the same.

The formation of cream may be observed through the glazed opening D, and the relative position of the cooling-reservoir changed as may be necessary. After the cream has all risen to the top of the milk the spigot B should be opened and said milk drawn off until nothing is left within the reservoir A but cream, which may be determined by means of the lower glazed opening C, after which said cream may be drawn into a separate vessel.

The apparatus described affords means whereby milk may be so rapidly cooled as to prevent fermentation, and all of the cream contained therein may be separated therefrom and removed in an exceedingly short time and with but little work.

If desired, milk within the reservoir A may be scalded by lowering the inner reservoir, E, to or near the bottom of the former, and then passing steam or hot water through the inlet-pipe G.

The more prominent features of my apparatus, considered separately, are old in this class of invention, but as adapted to each other and combined and arranged with other features a more convenient and effective apparatus results.

Having thus fully set forth the nature and merits of my invention, what I claim as new is—

1. The milk-cooler in which are combined and arranged, as described, the following elements, viz: a vat provided with glazed openings within its end and a spigot at its lower side, a covered ice-reservoir located centrally within said vat and provided with an overflow-pipe, and means whereby said ice-reservoir is held horizontally in a central position and is adjusted to and secured in vertical position, substantially as and for the purpose specified.

2. In combination with the reservoir E, the lugs I i, guide-bars K, strap a, shaft N, crank n, and cords O, all arranged to operate substantially as and for the purpose set forth.

In testimony that I claim the foregoing I have hereunto set my hand this 27th day of September, 1879.

SAMUEL S. HAYWARD.

Witnesses:
R. B. PRINDLE,
W. MERRIFIELD.